Dec. 5, 1950  J. E. LEONARD  2,532,775
SLIDE CHANGER FOR PROJECTORS
Filed Jan. 18, 1946  2 Sheets-Sheet 1
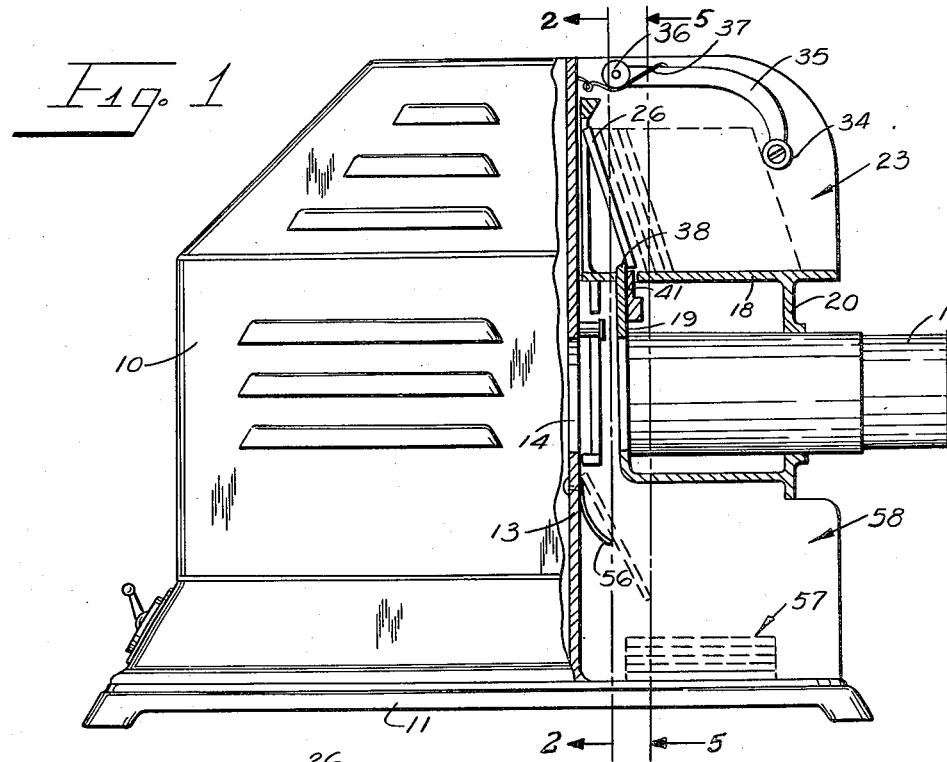
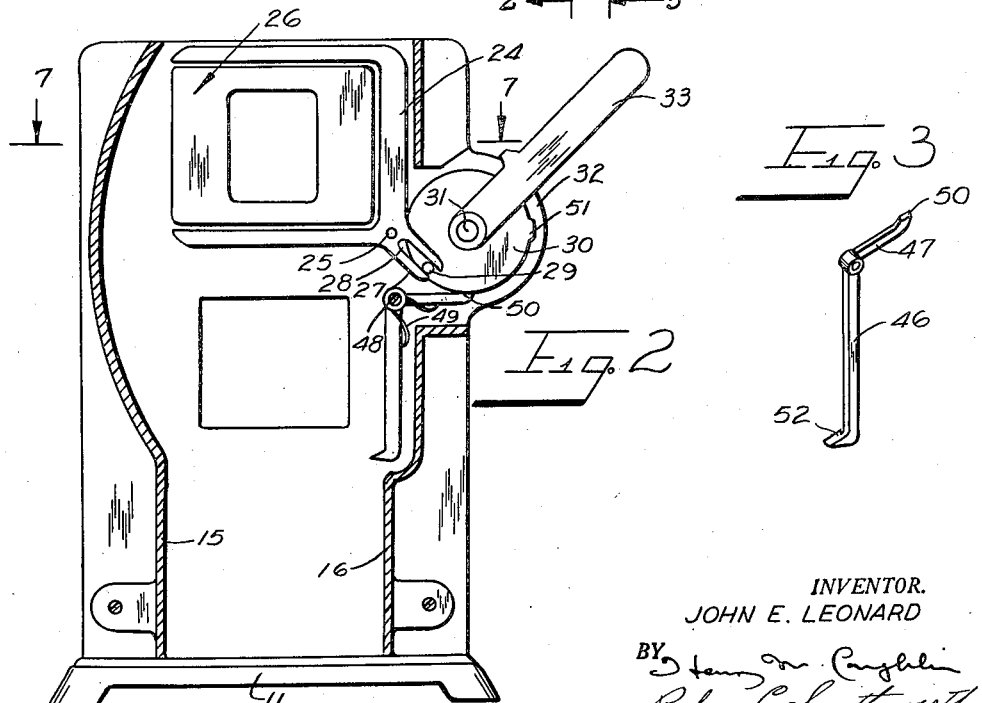
INVENTOR.
JOHN E. LEONARD
BY
ATTORNEYS Dec. 5, 1950 J. E. LEONARD 2,532,775
SLIDE CHANGER FOR PROJECTORS
Filed Jan. 18, 1946 2 Sheets-Sheet 2
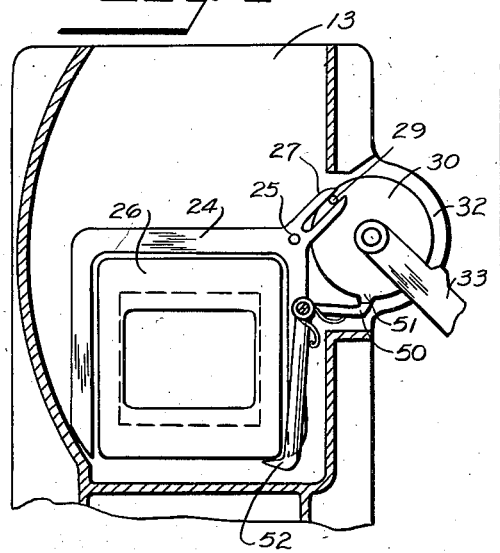
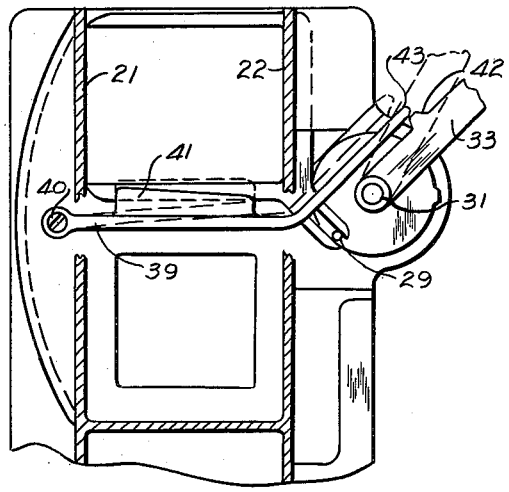
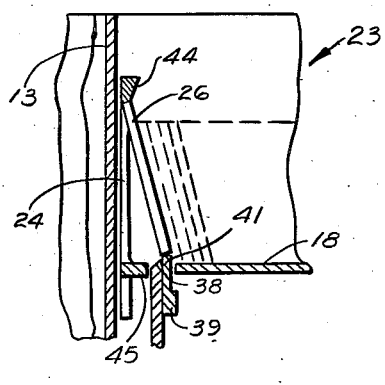
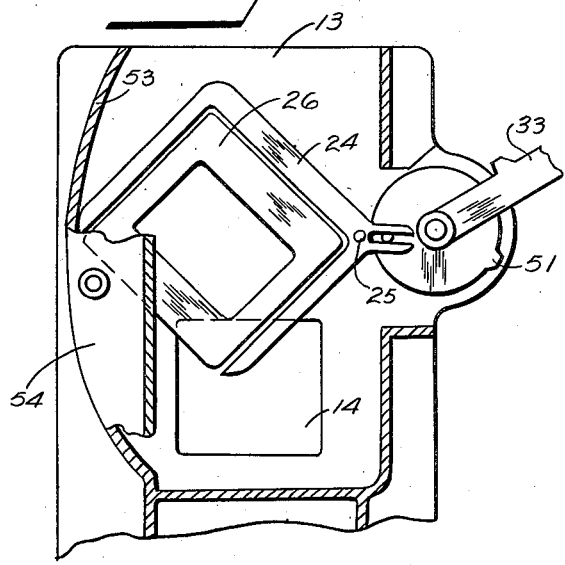
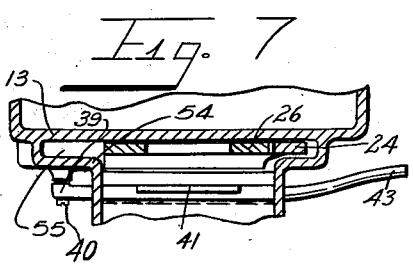
INVENTOR.
JOHN E. LEONARD
BY
ATTORNEYS

UNITED STATES PATENT OFFICE 2,532,775

SLIDE CHANGER FOR PROJECTORS

John E. Leonard, Binghamton, N. Y., assignor to General Aniline & Film Corporation, New York, N. Y., a corporation of Delaware Application January 18, 1946, Serial No. 642,070

7 Claims. (Cl. 88—28)

This invention relates to a slide changer for photographic projectors and the like. More specifically, the invention applies to the type of slide changer which operates from a magazine filled with a number of slides and is adapted to feed the slides in succession past the projecting beam and to discharge them in sequence.

Among the objects of the invention is that of devising a simple slide changer for photographic projectors, such as those projectors commonly employed for the well-known 2" x 2" slides.

It is a further object of the invention to devise a slide changer which, upon actuation of a small lever or other manually operated means, shall be effective to take one slide at a time from a supply thereof, move that slide into position to be projected, thereafter to discharge that slide, and then to repeat the operation.

A further object of the invention is to devise a simple and effective slide changer mechanism which shall be easily loaded with a plurality of slides to be shown in sequence, and which shall operate to feed a single slide only, no matter what the thickness of the slide may be so long as it lies within limits normally prescribed for standard slides of the type intended to be projected.

Another object of the invention is that of devising a slide changer which shall function in oscillatory manner thereby giving a simple and easy movement throughout a relatively small distance or angular extent.

It is a further object of the invention to devise a slide changer which shall function upon a relatively small movement of an operating lever or other control means, all the said movements necessary to the cycle of changing slides being effected by this lever.

Other objects will be apparent as the disclosure progresses.

In projecting slides, it is desirable for many reasons to load a plurality of slides in a magazine and thereafter to project them in sequence. In this way, loading may be done in normal light and thereafter the group of slides may be shown without giving thought to each indivdual slide to make certain that it enters the projection beam in proper relationship for being shown upright and in laterally correct relationship. This is frequently difficult when projecting a series of slides in darkness or semi-darkness.

According to the invention, a plurality of slides are properly arranged both in sequence and relative position in a group and are loaded in a magazine which is positioned in alignment with a shuttle adapted to be moved to and from a position in which it may receive slides from the magazine and to a second position in which it will present the slide in front of a projection gate. Preferably, although not necessarily, the shuttle has a rotary movement about a pivot adjacent one corner thereof, and such movement is imparted to the shuttle by a lever extending from the side of the projector, or by any other satisfactory means.

The group of slides in the magazine is urged in the direction of the shuttle by spring-pressed, or other devices adapted to the purpose. Normally, one end of the leading slide in the group is prevented from entering the shuttle by a lip or ledge extending into the pathway of the slides as they move along the magazine. For feeding a single slide at a time, a lever, just in advance of the lip, has a projection extending up through the magazine and parallel with the lip, said projection being so disposed and of such a width as to engage only one slide at a time. This lever and its projection, upon appropriate movement, lift the leading slide until it clears the lip whereupon means which tends to move the group of slides along the magazine will push it past the lip and into the shuttle. An inclined surface on the lip and, if necessary, one on the shuttle, facilitate the movement of the slide so that it enters the shuttle to be controlled thereby after it has been freed from the group. The movement of the shuttle carries the slide down into a position in the projecting beam and means hereafter to be more thoroughly described functions during passage of the shuttle and slide from one position to the other, to prevent the slide from becoming disengaged from its intended position within the shuttle, and thereafter when it reaches the position for projection, from being discharged before intended.

Upon intended movement of the control means, the mechanism which prevents premature discharge of the slide may be disengaged thereby to release the slide and permit it to fall by gravity into a receiving space where the slides are deposited in sequence in which they are shown.

The invention will be described in greater detail by reference to the accompanying figures of drawing, in which:

Figure 1 is a side elevation of a typical projector to which the invention has been applied, part thereof being in section.

Fig. 2 is a section taken across the projector just forwardly of the slide changing shuttle or at line 2—2, Fig. 1.

Fig. 3 is a detail of one of the elements illustrated in Figs. 1 and 2.

Fig. 4 is a section similar to that of Fig. 2 but showing the slide changing mechanism moved to its opposite position.

Fig. 5 is a section showing part of the mechanism of Fig. 2 and additional mechanism, the section being taken slightly forward of that in Figs. 2 and 4 or at line 5—5, Fig. 1.

Fig. 6 is a section through part only of that mechanism of Fig. 1 wherein the elevation and freeing of one slide is shown.

Fig. 7 is a section taken at line 7—7, Fig. 2.

Fig. 8 is a section similar to that of Fig. 4, but showing the shuttle part way through its path of travel as it moves a slide from the magazine into the projecting beam. The projector has a lamp house 10, a base 11 and the usual lens in a focusing lens tube 12. The front part of the instrument is separated from the lamp house by a wall 13 and an aperture 14 permits light to pass to illuminate the transparency when it is in position at the gate.

At the front of the projector, the casing is extended forwardly and comprises vertically disposed side walls 15 and 16 between which are the horizontal webs 17 and 18. The webs 17 and 18 are also supported between transverse walls 19 and 20 in which are provided suitable openings for the lens tube 12. The web 18 is also the base of the magazine.

Above the web 18 and at either side thereof are vertically extending walls 21 and 22 which define the sides of a magazine generally indicated by numeral 23. This magazine is open at the top, but the said walls 21 and 22 and the base 18 define a rectangular space for the accommodation of a plurality of slides disposed as illustrated in Fig. 1. The extent of this magazine may be of any convenient longitudinal dimension depending upon the number of slides which it is intended shall be loaded at one time. Generally speaking, the magazine is not designed to take more slides than may be ejected or discharged into the chamber adjacent the base of the projector, but this is not necessarily so since a plurality of slides may be projected, and upon gathering of as many slides as may be conveniently retained in the receiving chamber, they later may be removed whereupon a second group may be projected, etc.

As shown in Fig. 2, a shuttle of U-shape and designated by numeral 24 is pivoted at 25 to the wall 13 and is of such shape and size as to accommodate slides one of which is generally indicated by numeral 26. These slides may be of cardboard, metal, or other materials and may or may not have glass plates bound together and between which the film itself is sandwiched. These slides or mounts are relatively thin but vary depending upon the individual construction thereof. However, the mechanism herein described is adapted to function with any of the slides now employed and will feed one single slide at a time.

The shuttle 24 has an extension 27 which is slotted as at 28. This slot is engaged by a pin 29 projecting from a disk 30 pivoted at 31 to an extension 32 from the wall 13. An arm or operating lever 33 is also fixed to the disk 30 and by means of this arm 33 and the mechanism just described, the shuttle may be swung to the left and downwardly about its pivot 25 until it occupies the position of Fig. 4.

In that position, the image on the film carried by the slide is registered with the gate 14 and the projecting lens carried by the tube 12.

Now returning to Figs. 1, 5, and 6, the slides, when properly arranged, are inserted in the magazine 23 and are pressed forwardly toward the shuttle by rollers 34, one of which is shown in Fig. 1. These rollers are carried at the ends of curved arms 35 pivoted to swing about the pivots 36. While these rollers may bear against the group of slides and urge them to the back of the magazine by weight of the parts involved only, it is preferred to use coil springs, such as the spring 37, thereby to insure sufficient pressure no matter what the number of slides in the magazine may be. The pivot 36 is sufficiently high and the shape and length of the arms 35, such that the rollers 34 bear more or less centrally of the height of the outermost slide, even though they swing downwardly as the slides move along the magazine during projection.

Under the influence of the slide pressing means just described, the innermost slide is always pushed into engagement with the wall in back of the shuttle and against a lip 38 at the upper edge of the transverse web or magazine base 18. This lip 38 extends for a short distance above the top edge of the base 18 of the magazine. As illustrated in Figs. 1, 5, and 7, a transversely disposed arm or lever 39 is pivoted at 40 and projects through slots at either side of the forwardly projecting side wall members 21 and 22, beneath the base 18 of the magazine. There is a space at the innermost end of the magazine base 18 and in front of the wall 19 into which projects a thin extension 41 projecting upwardly above the main portion of the arm 39. This extension 41 is at least as thin as, and preferably slightly thinner than the thinnest slide for which the projector may be used. Upward movement of the arm 39 to the dotted-line position of Fig. 5 raises the innermost slide 26 as illustrated in Fig. 6. That movement is actually brought about by swinging the lever 33 upwardly as in Fig. 5 at which time a projection 42 in alignment with the end 43 of the arm 39 engages with arm 39, and raises it throughout the desired angular extent. The top edge of the extension 41 is disposed at such an angle to the horizontal, as shown in Fig. 5, that when elevated, it will be horizontal or at least will be parallel with the base of the magazine.

When raised to the position shown in Fig. 6, the innermost slide will, due to the pressure against the whole group of slides, be forced inwardly to slide from the relatively thin extension 41 on to the lip 38 which is bevelled or inclined as shown, thereby causing the slide to continue its movement until it has entered the shuttle 24.

To facilitate entry of the slides into the shuttle, the sides thereof may be bevelled as indicated at 44, and the lowermost portion 45 thereof (when the shuttle is in upper position) may be inclined in the same direction as the lip, although that is not illustrated in any of these figures.

Now referring to Figs. 2, 3, and 4, means is shown for retaining the slide at the gate during projection, but for releasing it when desired and prior to returning the shuttle to topmost position for receiving another slide. This mechanism includes a bell crank lever having a vertically extending arm 46 and a more or less horizontally extending arm 47. This bell crank lever pivots at 48 and a spring 49 normally moves it in such direction that a follower or toe 50 bears against the outer concentric surface of disk 30.

except when, upon movement of lever 33, a cam 51 engages it. At that time, a lever will be swung to the position illustrated in Fig. 4 where the hooked lower end 52 engages beneath the shuttle and also beneath the slide to prevent its falling or being ejected therefrom. This toe 52 is wide enough, as illustrated in Fig. 1, so that it engages beneath the slide even though the arm 46 must work in front of the plane of the slide and shuttle as illustrated.

In Figs. 7 and 8, the means for preventing release or displacement of the slide during its travel from one position to the other is illustrated. That means includes an arcuate guiding surface which is formed at the inner edge of the curved wall 53 and a front parallel wall 54. A space indicated by numeral 55, Fig. 7, between the rear wall 13, the wall 54 and the arcuate member above described is just sufficient to permit passage of the shuttle and slide carried thereby. Just before the shuttle reaches its lowermost position, Fig. 4, the cam 51 engages the toe 50 of the bell crank lever and pushes the hooked extension 52 into position in which it engages beneath the slide. Thus, before the slide passes from the control of the arcuate member 53, it is engaged by the part 52 of the bell crank lever.

While the same has not been illustrated in this case, since it does not form an essential portion of the slide changer mechanism itself, a presser member comes into engagement with the slide when it reaches its extreme position as shown in Fig. 4. These presser members are well known to those skilled in the art and function as a part of the gate assembly to maintain a slide or film in proper position while it is being illustrated and projected. Of course, such presser member is withdrawn prior to disengagement of the hook 52 and release or ejection of the slide. After release of the slides, they fall by gravity and are guided outwardly by a curved or other guide member 56 attached at the wall 13 and of such size and shape as to project the lowermost edge of the slide outwardly so that they are stacked in a pile 57 in the slide receiving chamber 58.

Actuation of the device has been described by reference to that embodiment illustrated wherein a lever 33 is rotated about a pivot. Of course, the movement of the parts may be varied and a rectilinear movement substituted, for example, a button slidable vertically along the side of the casing. If it is desired to control the changing of slides from a position a few feet away from the projector, the well-known Bowden wire cables may be employed by attaching them to actuate the lever 33 or some similar means.

Operation

In operation of the device, a plurality of slides are first arranged in proper order and position and are inserted in the magazine 23 by lifting the arms 35 so that the rollers 34 clear that space into which the plurality of slides are inserted. Then the arms 35 are lowered until the rollers bear against the slides thereby pushing them inwardly of the magazine until the leading slide reaches that position shown in Fig. 1.

For moving the first slide into the shuttle, the lever 33 is first elevated as shown in Fig. 5 and by contact of the projection 42 with the extending arm 43, the thin slide engaging portion 41 of the arm 39 moves upwardly against the bottom edge of the leading slide, elevating it as shown in Fig. 6. Thereupon the slide will move in the direction of the shuttle 24 due to the pressure exerted by the remaining slides in the magazine under the influence of the springs 37 or other means urging the rollers 34 downwardly and toward the back of the magazine.

That initial upward movement clears the first slide past the lip 38 and, as before explained, the inclined top surface of the lip causes the slide to move into the shuttle after which downward movement of the lever 33 rotates the shuttle as illustrated in Fig. 8 to the final projecting position of Fig. 4. It is to be noted that due to the positioning of the pin 29 within the slot 28 and the position of the lever in Fig. 2, the initial clearing movement is accomplished without any appreciable movement of the shuttle itself. For the slight angular turning of the lever 33 at that time, the only resulting movement of the pin in the slot is one which is substantially lengthwise thereof.

After the slide has been received in the shuttle, the lever is moved down and, of course, the projection 41 is withdrawn so that the next slide in the magazine may move up against the lip 38. Further downward movement of the lever 33 swings the shuttle throughout approximately a 90° movement to the position of Fig. 4. While change of position for the slide and shuttle is being effected, the slide is held back against the wall 13, since, at the start, the remaining slides in the group press against it at the top and as soon as the shuttle starts its oscillatory movement, both the shuttle and the slide are actuated within that space 55 between walls 13 and 54 of Figs. 7 and 8. As the arm 33 reaches a point in which the shuttle has approached very close to its lowermost position, cam 51 engages the toe 50 of the bell crank lever and moves as shown in Fig. 4 so that the hooked end thereof is in position to receive the slide thereby to prevent its premature release from the shuttle. The arm 33 is held in lowermost position until it is desired to release or reject the slide whereupon the initial movement of the arm releases the bell crank lever since cam 51 may be withdrawn from the toe 50 without appreciable movement of the shuttle since at that time the pin 29 is in position to move practically along the length of the slot 28.

After release of the slide, it falls into the group 57, Fig. 1, and the arm 33 and remainder of the mechanism may then return to the position illustrated in Fig. 2, under the influence of a spring (not shown). The operation may be repeated as frequently and as many times as desired.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a photographic slide changer, the combination of a magazine for a supply of slides, means for urging said slides along said magazine, a shuttle and a pivot therefor and means for swinging said shuttle to and from positions in one of which it receives slides from the magazine and another of which it thereafter presents them at a projection gate for projection, said means including a pivoted arm, an interconnecting means between the arm and shuttle including a slotted member projecting from the shuttle and a disk connected to said arm and having fixed therein a pin engageable within the slot in said projecting member, means for feeding one slide only at a time from the magazine to the shuttle, and means for retaining a slide at the projecting position including a lever, a pivot therefor, cam means controlled by said first-mentioned pivot arm for swinging said lever, and means projecting from said lever for engaging beneath a slide held in projecting position thereby to prevent its intended release from the shuttle.

2. In a photographic slide changer, the combination of a magazine for a supply of slides, means for urging said slides along said magazine, a shuttle and a pivot therefor and means for swinging said shuttle to and from positions in one of which it receives slides from the magazine and another of which it thereafter presents them for projection, said means including a pivoted arm, an interconnecting means between the arm and shuttle including a slotted member projecting from the shuttle and a disk connected to said arm and having fixed therein a pin engageable with the slot in said projecting member, means for feeding one slide only at a time from the magazine to the shuttle including a restraining lip projecting to the pathway of said slides as they move along the magazine toward the shuttle, and means adjacent the lip and projectible into the magazine for engaging a single slide only for moving it in a direction to clear the lip whereupon under influence of the pressure of the remaining slides, that slide will be advanced past the lip and into the shuttle, and means for releasably retaining a slide at the projecting position including a pivoted bell crank lever, having a hooked projection on one arm for engagement beneath a slide in projecting position, spring means for urging said bell crank lever out of engagement with the slide and a cam on the said disk engageable with the other arm of said bell crank lever for moving the lever to slide retaining position.

3. In a photographic slide changer, the combination of a magazine for a supply of slides, means for urging said slides along said magazine, a shuttle and a pivot therefor, said shuttle being swingable about said pivot to and from positions in one of which it receives slides from the magazine and another of which it thereafter presents them at a projector gate for projection, means for feeding one slide only at a time to the shuttle including a restraining lip projecting into the pathway of said slides and having a top surface inclined downwardly toward the shuttle so that a slide raised to clear the lip will tend to move down said inclined surface into the shuttle, and means engageable with a single slide only adjacent the lip, for elevating it to clear the lip whereupon, under influence of said means for urging the slides along the magazine, that slide will be moved onto the lip from which it will slide down said inclined surface to enter the shuttle.

4. In a photographic slide changer, the combination of a magazine for a supply of slides, means for urging said slides along said magazine, a shuttle and a pivot therefor, and means for swinging said shuttle to and from positions in one of which it receives slides from the magazine and another of which it thereafter presents them at a projection gate for projection, said means including a pivoted arm and interconnecting means between the arm and shuttle including a slotted member projecting from one of said means and a pin engaged within said slot and fixed to the other of said means, means for feeding one slide only at a time from the magazine to the shuttle, and means cooperating with the shuttle when it has moved a slide to the projection gate, for retaining the slide at the projecting position, including a movable slide engaging member and means forming a part of the shuttle swinging means for causing the movable slide engaging member to take a position in which it prevents release of the slide, said means for swinging the shuttle further being effective to retract the slide engaging member when said slide is to be released prior to returning the shuttle for reception of another slide from the magazine.

5. In a photographic slide changer, the combination of a magazine for a supply of slides, means for urging said slides along said magazine, a shuttle and a pivot therefor and means for swinging said shuttle to and from positions in one of which it receives slides from the magazine and another of which it thereafter presents them for projection, said means including an actuating arm, interconnecting means between the arm and shuttle for swinging the latter by angular movement of the former, means for feeding one slide only at a time from the magazine to the shuttle which includes a restraining lip in the pathway of the slides as they move along the magazine toward the shuttle, and a movable means having a projecting part adjacent the lip and projectable into the magazine to engage a single slide only adjacent the lip and move it upwardly to clear the lip so that pressure of the remaining slides will force it into the shuttle, means for interconnecting the actuating arm and movable means to move the latter for clearing a slide upon movement of the arm in one direction, and means cooperating with the shuttle when it has moved a slide to the projection gate, for retaining the slide at the projecting position, including a movable slide engaging member and means forming a part of the shuttle swinging means for causing the movable slide engaging member to take a position in which it prevents release of the slide, said means for swinging the shuttle further being effective to retract the slide engaging member when said slide is to be released prior to returning the shuttle for reception of another slide from the magazine.

6. In a photographic slide changer for projectors, a magazine for storing a supply of slides to be projected, means for urging said slides in a direction along said magazine, a shuttle adapted to hold a slide, a pivot therefore, said shuttle being swingable about said pivot between two extreme positions, in one of which said shuttle will receive a slide and in another of which positions it will place the received slide in alignment for projection, means for feeding one slide at a time from said magazine to said shuttle including a restraining lip projecting into the pathway of the slides moving in said direction and toward said shuttle and means projectable into said magazine engaging the bottom of a single slide in a position in said pathway for lifting it over said restraining lip whereupon under influence of said first mentioned means said slide will advance past the lip and into the shuttle.

7. In a photographic slide changer for projectors, a magazine for storing a supply of slides to be projected, means for urging said slides in a direction along said magazine, a shuttle adapted to hold a slide, a pivot therefore, said shuttle being swingable about said pivot between two extreme positions in one of which said shuttle will receive a slide and in another of which positions it will place the received slide in alignment for projection, means for feeding one slide at a time from said magazine to said shuttle including a restraining lip projecting into the pathway of the slides moving in said direction and toward said shuttle and a pivoted lever having an extension projecting into the magazine and adjacent said lip engaging the bottom edge of the slide held by said lip and lifting it over said restraining lip whereupon under influence of said first mentioned means said slide will advance past the lip and into the shuttle.

JOHN E. LEONARD.

REFERENCES CITED

The following references are of record in the file of this patent:

UNITED STATES PATENTS

| Number | Name | Date |
|---|---|---|
| 1,001,965 | Leopold | Aug. 29, 1911 |
| 1,093,401 | Gottlieb | Apr. 14, 1914 |
| 1,247,608 | Alguire | Nov. 27, 1917 |
| 1,325,825 | Bailey | Dec. 23, 1919 |
| 1,371,871 | Dietz | Mar. 15, 1921 |
| 2,353,888 | Fuge | July 18, 1944 |

FOREIGN PATENTS

| Number | Country | Date |
|---|---|---|
| 8,185 | Great Britain | of 1892 |